UNITED STATES PATENT OFFICE.

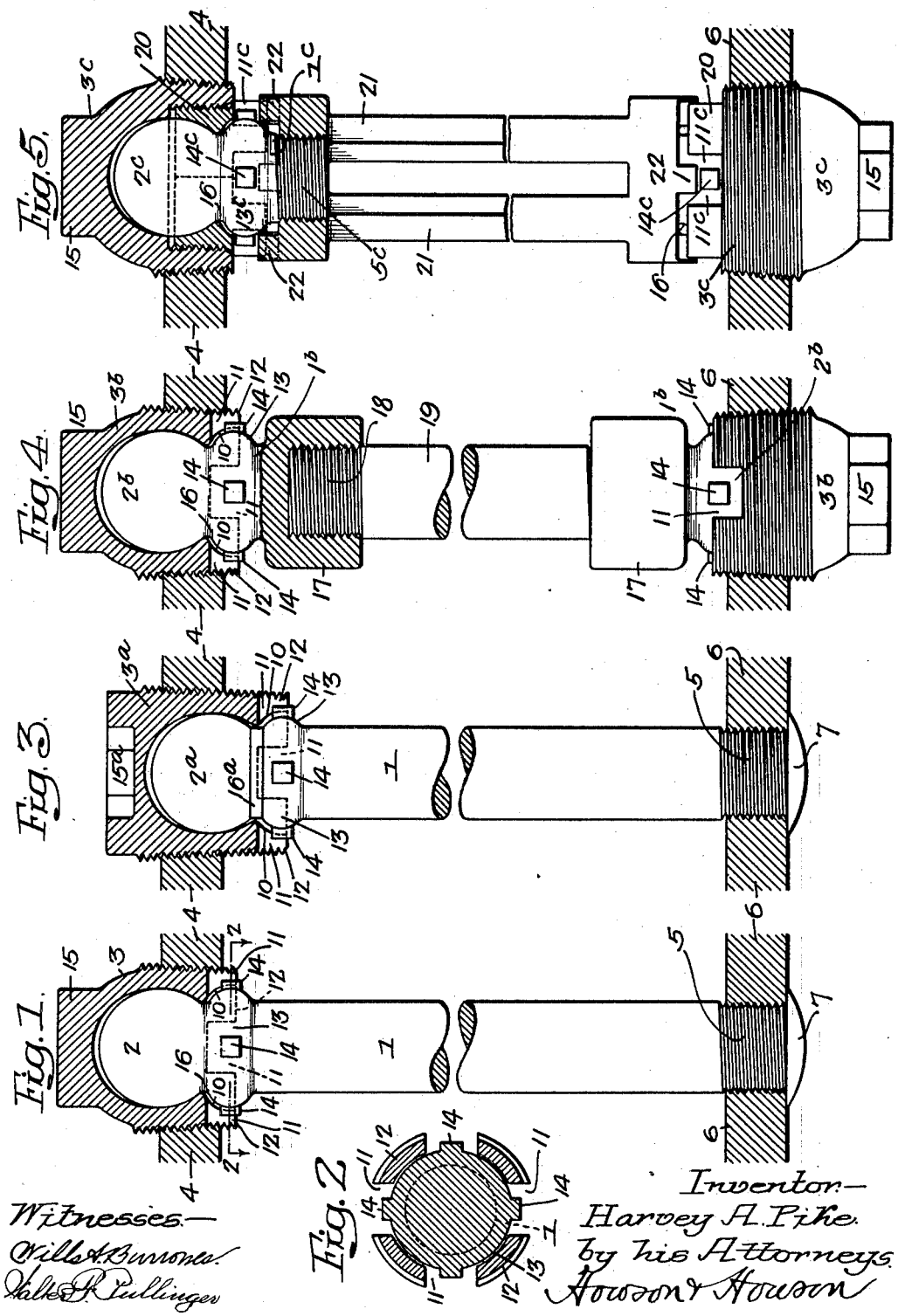

HARVEY A. PIKE, OF SOUTH ORANGE, NEW JERSEY.

STAY-BOLT.

1,113,046. Specification of Letters Patent. Patented Oct. 6, 1914.

Application filed June 17, 1914. Serial No. 845,669.

*To all whom it may concern:*

Be it known that I, HARVEY A. PIKE, a citizen of the United States, and a resident of South Orange, Essex county, New Jersey, have invented certain Improvements in Stay-Bolts, of which the following is a specification.

My invention relates to stay bolts employed for securing or staying the sheets or walls of boiler shells, and the object of my present invention is to provide structures of this character, which may be of the ball and socket type, with means adjacent the ball head of the bolt designed for the purpose of breaking away or rupturing any incrustation which may collect adjacent the ball and socket portion of such stay bolt and the plug receiving the ball end of the same. These and other features of my invention are more fully described hereinafter, reference being had to the accompanying drawings, in which:

Figure 1, is a sectional view of a stay bolt and its attaching means, showing the same connecting a pair of boiler sheets; Fig. 2, is a sectional view taken on the line 2—2, Fig. 1; Fig. 3, is a view similar to Fig. 1, illustrating a modified form of attaching means, and Figs. 4 and 5, show types of stay bolts, made in a plurality of parts, within the scope of my invention.

In Figs. 1 and 2, of the drawings herewith, 1 represents the main stem of the bolt, which may have a ball 2 at one end adapted to a socket plug 3 threaded into one shell or wall 4 of the boiler; the opposite end 5 of said bolt being threaded into the wall or shell 6 of the boiler, and then riveted over against the latter, as indicated at 7.

Incrustation usually takes place at the junction of the socket plug and bolt at the point where the ball 2 joins the stem 1 of the bolt. I propose to overcome this by the following means: The inner ends of the socket plugs, which are preferably tapered, are additionally socketed or concaved at 10, and notched or slotted at 11 to form projections 12; while the bolts are provided with rounded annular shoulders or ribs 13 adjacent the ball-head 2, which ribs or shoulders seat in the concaved portions 10 of the socket plugs, and have outstanding lugs or projections 14 disposed in the notches or slots 11. As shown in the sectional plan, Fig. 2, the lugs or projections 14 have a considerable range of movement in the spaces formed by the notches or slots 11, and by reason of their contact with the socket plugs, any movement of the bolts at their ball and socket attachment, occasioned by the expansion or distortion of the walls of the boiler under the stress of heating and cooling, will have the effect of cracking out or breaking away any incrustation which occurs at these several points between the projections 12 and 14.

My invention may be embodied in various forms of stay bolt structures. As shown in Fig. 1, for instance, the socket plug 3 receives a substantially spherical bolt head 2, and said plug is provided with an external nut-shaped head 15 for the reception of a wrench when setting the same in place. In this instance the rounded annular shoulder 13 is joined to the bolt by a rounded neck portion 16.

In Fig. 3, I have shown a construction in which the plug $3^a$ is recessed at $15^a$ for the reception of a socket wrench. In this structure substantially the entire head $2^a$ of the bolt $1^a$ is below the plane of the boiler wall, and in this instance, the rounded annular shoulder portion 13 of the bolt is joined to the head $2^a$ by a straight-walled neck portion $16^a$.

In Fig. 4, I have shown a construction in which the bolt structure is in a plurality of parts or pieces; portions $1^b$ having ball heads $2^b$ adapted to socket plugs $3^b$ in opposite boiler shells 4 and 6, and each of said portions carrying a threaded socket 17 receiving the threaded ends 18 of a connecting stem or bolt 19.

In the structure shown in Fig. 5, the plug $3^c$ receives a bolt section $1^c$ having a head $2^c$, an annular shoulder $13^c$, and a threaded portion $5^c$. The head and shoulder are formed substantially as illustrated in the structure shown in Fig. 1, and they are confined to the plug by a ring 20 made in half sections, which sections are assembled around said head $2^c$ and then threaded into the plug $3^c$. The mouth of these sections is concaved to receive the shoulder $13^c$, and they are notched at $11^c$ for the reception of and coaction with lugs $14^c$ of the shoulder $13^c$. The portion $5^c$ is threaded into the end of a skeleton sleeve or connecting member 21, and the ends of this member are also provided with lugs 22 adapted to enter the notches $11^c$, and prevent such rotative movement of the headed bolt structure as would tend to separate the parts after they have been assembled in the boiler shells. In this arrangement, the lugs 22 form additional means for breaking or cracking out incrusation.

I prefer projections with angular faces, but they may differ in shape from those shown in the drawings.

It will be understood, of course, that the bolt or bolt part is finished with the head 2, 2ª, etc., and the rounded shoulder or projection 13, 13ª, etc., and that the socket plug 3, 3ª, etc, having the concaved mouth to receive said shoulder 13, 13ª, etc., in the structures shown in Figs. 1, 2, 3 and 4, is drawn or compressed around said head and subsequently threaded in any usual or well known manner. These sprocket plugs are tapered in common with the usual practice.

It will be understood, of course, that the ball and socket structure shown in Figs. 4 and 5, may be disposed at one end only in one of the boiler shells, and employed with a bolt that is threaded into the opposite shell of the boiler in the manner shown in Figs. 1 and 3. In such an instance, in the use of the structure shown in Fig. 5, the connecting member 21 would be omitted entirely, and the bolt section 1ᶜ with its threaded portion 5ᶜ would be elongated for engagement with the boiler shell.

I claim:

1. In a stay bolt structure, the combination of a headed member, a socket plug receiving the head of said member, said plug having a concaved edge on its inner side with notches, a shoulder carried by the headed member adapted to the concaved edge, and lugs carried by said shoulder and disposed in the recesses formed by said notches.

2. In a stay bolt structure, the combination with a pair of boiler shells, of a headed member, a socket plug adapted to one of said walls and receiving said head, said plug projecting through the boiler wall; the inner edge of said plug being beveled or rounded and provided with notches, a rounded shoulder carried by the headed member and seating in open end of said plug, and lugs carried by said headed member and disposed in the recesses formed by said notches.

3. A stay bolt structure comprising a headed bolt, a socket plug receiving said head and adapted to be threaded into the shell of a boiler, said socket plug having its inner side concaved, and a rounded shoulder carried by the bolt and disposed in the concaved portion of said plug, said parts having coöperating projections and recesses.

4. A stay bolt structure comprising a headed bolt, a socket plug receiving said head and adapted to be threaded into the shell of a boiler, said socket plug carrying a concaved notched throat, a shoulder carried by the bolt, and lugs carried by said shoulder disposed in the recesses formed by said notches.

5. A stay bolt structure comprising a headed member, a socket plug adapted to be threaded into the shell of a boiler and receiving said head, said socket plug having its inner portion provided with a concaved throat with notched edges, a shoulder carried by the bolt, lugs carried by said shoulder and disposed in the recesses formed by said notches, and a spacing member carried by a second boiler shell and connected to said headed member.

6. A stay bolt structure for connecting a pair of boiler shells comprising a headed member, a socket plug adapted to be threaded into one shell and receiving said head, said socket plug having its inner portion provided with a concaved throat with notched edges, a rounded shoulder carried by the bolt, lugs carried by said shoulder and disposed in the recesses formed by said notches, a bolt attached to the other boiler shell, and a socketed portion carried by said headed member and receiving said bolt.

In testimony whereof, I have signed my name to this specification, in the presence of two subscribing witnesses.

HARVEY A. PIKE. [L. S.]

Witnesses:
GEO. GARRABRANT,
H. J. MURRAY.

Copies of this patent may be obtained for five cents each, by addressing the "Commissioner of Patents, Washington, D. C."

Correction in Letters Patent No. 1,113,046.

It is hereby certified that in Letters Patent No. 1,113,046, granted October 6, 1914, upon the application of Harvey A. Pike, of South Orange, New Jersey, for an improvement in "Stay-Bolts," an error appears in the printed specification requiring correction as follows: Page 2, line 18, for the word "sprocket" read *socket;* and that the said Letters Patent should be read with this correction therein that the same may conform to the record of the case in the Patent Office.

Signed and sealed this 20th day of October, A. D., 1914.

[SEAL.]

J. T. NEWTON,
*Acting Commissioner of Patents.*